United States Patent [19]
Aesch, Jr.

[11] Patent Number: 5,960,584
[45] Date of Patent: Oct. 5, 1999

[54] PHYSICAL TERMITE BARRIER AND TERMITICIDE DELIVERY SYSTEM AND METHOD

[76] Inventor: Harold W. Aesch, Jr., 2054 E. Saltsage Dr., Phoenix, Ariz. 85048

[21] Appl. No.: 09/120,356

[22] Filed: Jul. 22, 1998

[51] Int. Cl.⁶ .................................................. A01M 1/24
[52] U.S. Cl. ....................... 43/124; 52/101; 138/DIG. 11
[58] Field of Search .................................... 43/124, 132.1, 43/900; 52/101, 168, 741.3; 137/357; 239/200, 208, 209, 288; 138/105, 106, 174, 175, 177, 110, DIG. 11

[56] References Cited

U.S. PATENT DOCUMENTS

| | | | |
|---|---|---|---|
| 2,747,935 | 5/1956 | Szantay | 138/89 |
| 2,750,232 | 6/1956 | Szantay et al. | 138/106 |
| 2,842,892 | 7/1958 | Aldridge et al. | 43/124 |
| 2,981,025 | 4/1961 | Woodson | 43/124 |
| 3,205,619 | 9/1965 | Henry | 239/566 |
| 3,209,485 | 10/1965 | Griiffin | 43/124 |
| 3,330,062 | 7/1967 | Carter | 43/124 |
| 3,513,586 | 5/1970 | Meyer et al. | 43/124 |
| 3,602,248 | 8/1971 | Peacock | 43/124 |
| 3,676,949 | 7/1972 | Ramsey | 43/124 |
| 3,782,026 | 1/1974 | Bridges et al. | 43/124 |
| 3,996,968 | 12/1976 | Bergman et al. | 138/177 |
| 4,028,841 | 6/1977 | Lundwall | 43/124 |
| 4,040,215 | 8/1977 | Totsuka | 43/132.1 |
| 4,522,716 | 6/1985 | LaValley | 138/174 |
| 4,625,474 | 12/1986 | Peacock et al. | 52/101 |
| 4,742,641 | 5/1988 | Cretti | 43/132.1 |
| 4,944,110 | 7/1990 | Sims | 43/124 |
| 5,007,197 | 4/1991 | Barbett | 43/124 |
| 5,184,418 | 2/1993 | Fletscher | 43/124 |
| 5,347,749 | 9/1994 | Chitwood et al. | 43/124 |
| 5,353,544 | 10/1994 | Tsutsumi et al. | 43/124 |
| 5,374,138 | 12/1994 | Byles | 138/177 |
| 5,378,086 | 1/1995 | Campbell, Jr. et al. | 43/124 |
| 5,678,362 | 10/1997 | Hulls et al. | 43/124 |
| 5,819,466 | 10/1998 | Aesch et al. | 52/101 |
| 5,876,665 | 3/1999 | Zalis | 43/132.1 |
| 5,881,494 | 3/1999 | Jenkins | 43/124 |
| 5,904,007 | 5/1999 | Trapnell | 52/101 |

*Primary Examiner*—Michael J. Carone
*Assistant Examiner*—Darren Ark
*Attorney, Agent, or Firm*—John D. Lister

[57] ABSTRACT

A termiticide emitter system forms a physical termite barrier and delivers termiticide to potential termite entry areas of the fill dirt underneath the concrete foundation slab of a building, including the peripheral edges and along expansion joints and controlled cracks of the concrete foundation slab. With this system no vapor barrier sheet is required intermediate the underside of the concrete foundation slab and the fill dirt. A main component of the system is a flexible, polymeric termiticide emitter tube which is disposed intermediate an upper surface of the fill dirt and the underside of the concrete foundation slab at the peripheral edges of and along any expansion joints and controlled cracks in the concrete foundation slab. The emitter tube includes: a) a tube having a plurality of downwardly directed dispensing orifices spaced along the length of the tube for emitting termiticide in a generally downward direction below the horizontal; and b) a flexible, polymeric upper shield, integral with the tube and extending along an upper portion of the tube for the length of the tube, for preventing the dispensing orifices of the tube from being clogged by wet concrete when the foundation slab is poured and for forming a physical termite barrier.

12 Claims, 2 Drawing Sheets

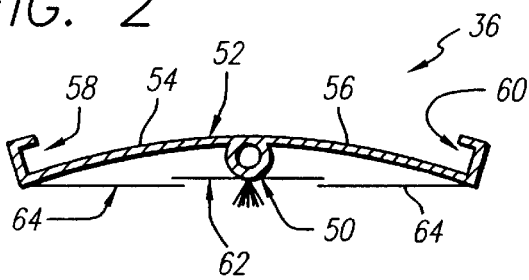
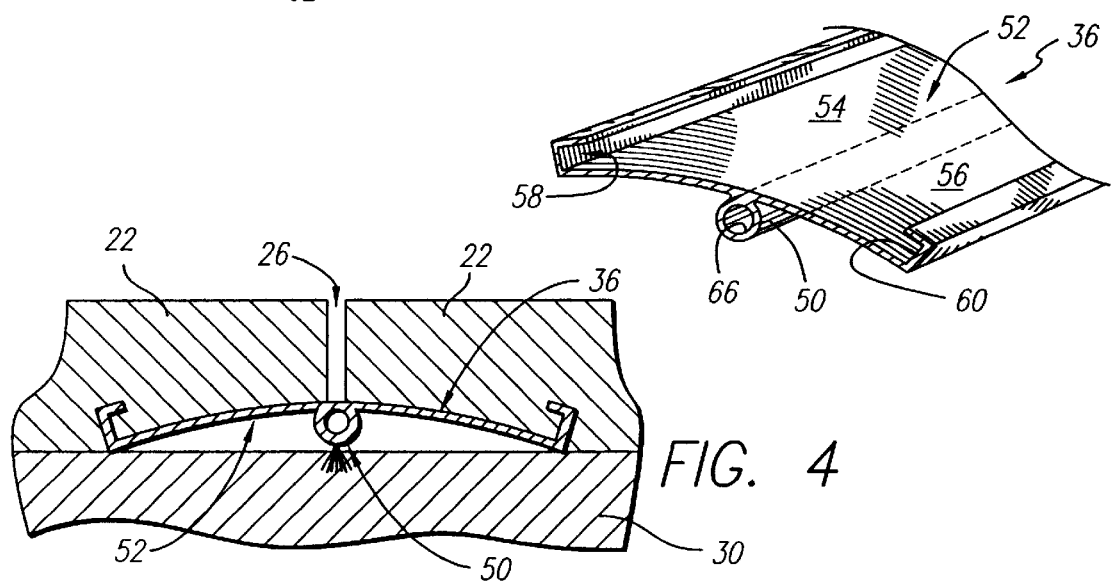
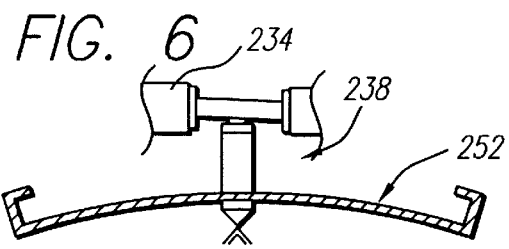
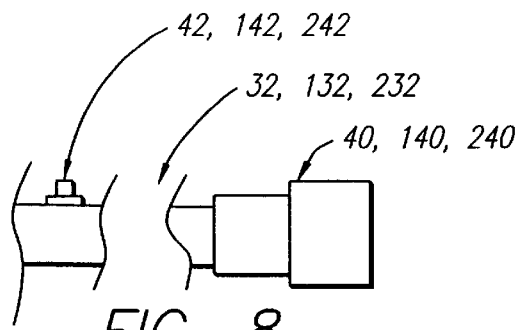
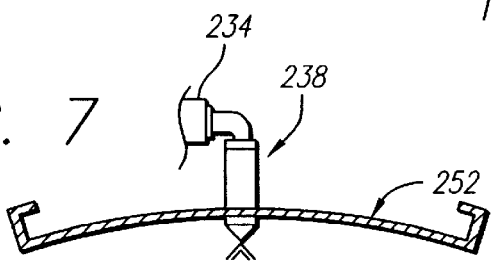

PHYSICAL TERMITE BARRIER AND TERMITICIDE DELIVERY SYSTEM AND METHOD

BACKGROUND OF THE INVENTION

The present invention relates to a physical termite barrier and termiticide delivery system and, in particular, to a physical termite barrier and termiticide delivery system for use under concrete foundation slabs, especially, but not limited to concrete foundation slabs having no vapor barrier disposed intermediate the underside of the concrete foundation slab and the fill dirt beneath the slab. The termiticide delivery system utilizes a termiticide emitter tube with an integral shield which anchors directly into the underside of the concrete slab for preventing wet concrete from clogging the dispensing orifices of the termiticide emitter tube when the concrete foundation slab is poured and for forming a physical barrier to termites directly beneath the concrete foundation slab. The termiticide emitter tube is anchored to the concrete foundation slab along the peripheral edges of the slab as well as along expansion joints and controlled cracks in the slab to dispense termiticide and form a physical barrier to the entry of termites through the concrete foundation slab and into a structure built on the concrete foundation slab. Preferably, the dispensing orifices of the termiticide emitter tube are uniform in size and equally spaced along the termiticide emitter tube to permit the amount of the termiticide solution delivered per foot of tubing to be calibrated.

Heretofore there have been a number of fluid distribution systems for insecticide, comprised of conduit capable of emitting pesticide through apertures or valves, for incorporation in or under a building foundation. A number of systems are elaborate in construction, requiring extensive modifications for traditional and conventional building methods, expensive pumps and reservoirs, and resulting substantial increases in building cost. For example, in U.S. Pat. No. 3,513,586, to Meyer et al, Meyer et al disclose and teach a distribution system comprising tube means disposed within a building footer constructed of conventional concrete building blocks, requiring, among other things, additional support members and plate members that, but for the distribution system, would not be required as part of the footer.

U.S. Pat. No. 3,209,485 to Griffen discloses a pesticide distribution system comprised of multiple, independent, branched circuits to be installed within and under a foundation. The system comprises many parts and installation requires multiple steps at different stages of construction of the building.

U.S. Pat. No. 3,602,248, to Peacock discloses a distribution system comprised of a plurality of parallel connected pipe branches, each branch thereof short enough so that fluid pressure is maintained along the entire piping, and at least two inlets into each branch. Each branch requires a closure fitting at the end opposite the inlet end. Multiple pumps are required to maintain uniform pressure in the branch lines.

There are a number of related systems for distributing pesticide within the walls of buildings. U.S. Pat. No. 3,676,949, to Ramsey discloses pipes with emitter nozzles passing through studs of the walls, with a nozzle disposed between each set of studs. U.S. Pat. No. 3,782,026, to Bridges et al discloses pipe extending within the walls or alternatively, beneath baseboard moldings on the interior walls, permitting injection of insecticide gas within the walls. U.S. Pat. No. 4,028,841, to Lundwall discloses an insecticide storage and pressurizing system installed in the attic and perforated pipes carry pest control fluid into the building walls. U.S. Pat. No. 4,742,641, to Cretti discloses a built-in reservoir installed within a building wall and pesticide distributed whenever the pump is operated, which can be done by a timing device for injecting predetermined amounts at predetermined spaced intervals. U.S. Pat. No. 3,330,062, to Carter discloses another pest control system utilizing pipes installed through holes drilled through the wall studs of a building. The pipes require threaded end caps at the distal ends thereof. U.S. Pat. No. 4,944,110, to Simms discloses a method of applying pesticide to the concealed areas of a building, utilizing injection of pressurized chemicals into perforated tubing. U.S. Pat. No. 5,378,086 to Campbell, Jr. et al, discloses a system for exterminating and controlling subterranean termites which utilizes steam delivered through a series of pipes to exterminate and control termites. U.S. Pat. No. 5,678,362, to Hulls et al, discloses a termite shield which is provides a physical barrier between a foundation and a wooden building structure.

The termiticide delivery system of the present invention relates generally to termiticide delivery systems of the type disclosed in U.S. Pat. No. 5,347,749, issued Sep. 20, 1994, Chitwood et al, and entitled Termiticide Delivery System (the disclosure of U.S. Pat. No. 5,347,749 is hereby incorporated herein, by reference, in its entirety). However, the termiticide delivery system of U.S. Pat. No. 5,347,749, requires the use of a vapor barrier sheet beneath the concrete foundation slab while the termiticide delivery system of the present invention is an improved system especially suited for use under concrete foundation slabs where no vapor barrier sheet is disposed intermediate the underside of the concrete foundation slab and the fill dirt beneath the concrete foundation slab. The termiticide delivery system of the present invention is particularly useful in certain areas of the country, such as the southwestern desert areas of the United States, where building codes prohibit the use of vapor barriers intermediate the concrete foundation slabs and the fill dirt.

However, it should be noted, that while the termiticide delivery system of the present invention is especially suited for use under concrete foundation slabs without vapor barrier sheets, the system of the present invention can also be used under concrete foundation slabs where vapor barriers are used. In fact, the termiticide delivery system of the present invention with its physical termite barrier can improve termiticide delivery to the fill dirt beneath concrete foundation slabs with vapor barriers and also provide a physical termite barrier at certain locations beneath the concrete foundation slabs, such as along the peripheral edges of the slab, especially where the vapor barrier sheets are cut to dimensions less than those of the slab to thereby unintentionally provide entry points to termites along the peripheral edges of the slab.

In the event of a subterranean termite infestation, rate instructions on pesticide labels and in state and local codes require a minimum amount of termiticide solution to be dispensed, per each ten (10) linear feet, to critical termite entry areas such as areas adjacent the edges of the concrete foundation slab, the utility openings in the concrete slab, the expansion joints or controlled cracks in the concrete slab, etc.

Accordingly, there is a need for a termiticide delivery system with a termiticide emitter tube that: a) can be quickly and easily installed, before pouring the concrete for the foundation slab, with or without a moisture barrier intermediate the underside of the concrete foundation slab and the fill dirt; b) forms a physical termite barrier anchored to the underside of the concrete foundation slab that can expand and contract with the expansion and contraction of the slab; and c) can be calibrated to deliver a selected amount of termiticide per linear foot of tubing.

SUMMARY OF THE INVENTION

The termiticide delivery system of the present invention delivers termiticide to potential termite entry areas of the fill dirt underneath the concrete foundation slab of a building, including the peripheral edges and along expansion joints and controlled cracks of the concrete foundation slab. With the termiticide delivery system of the present invention no vapor barrier sheet is required intermediate the underside of the concrete foundation slab and the fill dirt.

A main component of the termiticide delivery system of the present invention is a flexible, polymeric termiticide emitter tube which is disposed intermediate an upper surface of the fill dirt and the underside of the concrete foundation slab at the peripheral edges of and along any expansion joints and controlled cracks in the concrete foundation slab. The emitter tube includes: a) a tube having a plurality of downwardly directed dispensing orifices spaced along the length of the tube for emitting termiticide in a generally downward direction below the horizontal; and b) a flexible, polymeric upper shield, integral with the tube and extending along an upper portion of the tube for the length of the tube, for preventing the dispensing orifices of the tube from being clogged by wet concrete when the foundation slab is poured. Preferably, the lateral edges of the termiticide emitter tube's flexible shield have anchors for anchoring the termiticide emitter tube into the underside of the concrete foundation slab and creating a physical barrier, which remains secured to the underside of the slab and can accommodate expansion and contraction of the slab, to prevent termites from ascending through portions of the concrete foundation slab where the termiticide emitter tube is installed.

Preferably, the dispensing orifices in the termiticide emitter tube are uniform in diameter and equally spaced along the length of the termiticide emitter tube to permit the amount of the termiticide solution delivered per foot of tubing to be calibrated. With this system the amount of termiticide solution required to deliver a selected amount of termiticide solution to the area beneath the foundation slab per liner foot of tubing can be easily calculated.

BRIEF DESCRIPTION OF THE DRAWINGS

FIG. 2 is a transverse cross section through a termiticide emitter tube of the present invention.

FIG. 3 is a perspective view of the termiticide emitter tube of FIG. 2.

FIG. 4 is a transverse cross section through a portion of a concrete foundation slab at an expansion joint or a controlled crack with the termiticide emitter tube of FIGS. 2 and 3 anchored into the slab to provide a physical termite barrier as well as a termiticide solution dispensing means.

FIG. 6 is an elevational view of a termiticide emitter nozzle assembly of the present invention connected to a termiticide delivery branch line by a "T" fitting.

FIG. 7 is an elevational view of a termiticide emitter nozzle assembly of the present invention connected to a termiticide delivery branch line by an-elbow fitting.

FIG. 8 is a fragmentary view of a main manifold or trunk termiticide delivery line used in the termiticide delivery system of the present invention.

DESCRIPTION OF THE PREFERRED EMBODIMENTS

Figure 1:
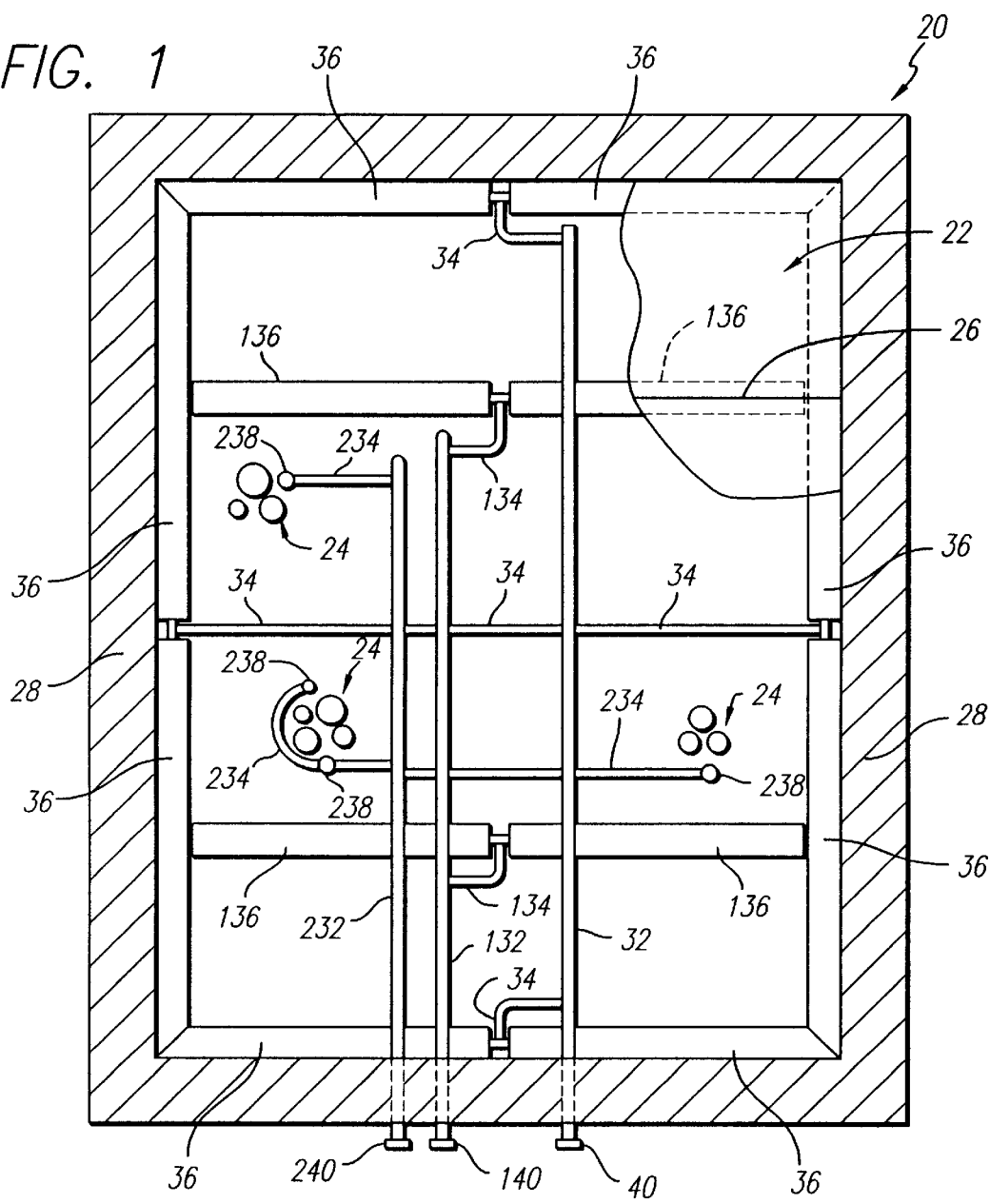
FIG. 1 is a schematic plan view of a foundation with a major portion of the concrete foundation slab broken away to show an embodiment of the termiticide delivery system of the present invention, with a plurality of zones, disposed intermediate the underside of the foundation slab and the fill dirt.

FIG. 1 of the drawings shows the termiticide emitter system 20 of the present invention in place under a concrete foundation slab 22 for a building under construction. The concrete foundation slab has been mostly broken away to better illustrate the termiticide emitter system 20. Utilities 24 protrude through openings in the concrete foundation slab 22 and the slab is provided with expansion joints or controlled cracks 26 to permit expansion of the slab 22. In addition, minute spaces exist between the peripheral edges of the concrete foundation slab 22 and the foundation wall 28 which is typically made of concrete, concrete blocks or similar materials.

The concrete foundation slab 22 is typically poured after the utilities 24 and the foundation wall 28 are in place. Accordingly, as the concrete forming the concrete foundation slab 22 cures and contracts, minute spaces form between the utilities 24 and the slab 22 and the foundation wall 28 and the slab 22. These small spaces, adjacent the edges of the concrete foundation slab 22 and the utilities 24, along with the expansion joints or controlled cracks 26, provide entry points for subterranean termites to enter the building from their earthen tunnels in the fill dirt 30 beneath the building. Since the termites can construct earthen tunnels up to the structural studs and other wood used in the framing of the building through these entry points, these entry points are critical places that require recurring soil treatment.

The termiticide emitter system 20 shown in FIG. 1 includes: a plurality of manifold or trunk lines 32, 132 and 232; branch delivery lines 34, 134 and 234; termiticide emitter tubes 36 and 136; and termiticide emitter nozzle assemblies 238. Preferably, the manifold or trunk lines 32, 132 and 232 are a flexible, relatively large diameter hose or tube, e.g. a one half inch nominal inside diameter polymeric hose or tube. The manifold or trunk lines 32, 132 and 232 are sealed at one end, and, as shown in FIG. 8, each manifold or trunk line has a threaded connector fitting with a removable cap or other conventional connector fitting 40, 140 and 240, respectively, at the other end that is adapted to be connected to a source of pressurized termiticide solution (not shown) for supplying pressurized termiticide solution to the different zones of the termiticide emitter system 20 during soil treatments. In the termiticide emitter system 20 shown, the termiticide emitter tubes 36 supply a first zone, the termiticide emitter tubes 136 supply a second zone and the termiticide emitter nozzle assemblies 238 supply a third zone. This enables the termiticide emitter system 20 to be calibrated as will be more fully discussed hereinafter.

As shown in FIG. 1, the manifold or trunk line 32 extends for substantially the entire length of the concrete foundation slab 22 with the end of the manifold or trunk line that is provided with the connector fitting 40 being located on the outside of the foundation wall 28 for ease of access. As shown in FIG. 8, the manifold or trunk line 32 is provided with conventional connectors 42 over which the ends of the branch delivery lines 34 are placed to connect the branch delivery lines to the manifold or trunk line 32. Preferably, the branch delivery lines are flexible smaller diameter hoses or tubes, e.g. one quarter inch nominal inside diameter polymeric hoses or tubes. The branch delivery lines 34 connect the termiticide emitter tubes 36 to the manifold or trunk line 32 at selected locations along the length of the manifold or trunk line 32 to deliver termiticide to the termiticide emitter tubes 36 along the perimeter or peripheral edges of the slab 22 when the system is in use. The termiticide emitter tube sections 36 are connected to the ends of the branch delivery lines 34 by conventional "T" fittings or other conventional fittings and the different sections of the termiticide emitter tubes 36 are typically connected together at the corners of the concrete foundation slab 22 by conventional elbow connectors.

As shown in FIG. 1, the manifold or trunk line 132 extends substantially to the farthest expansion joint or controlled crack 26 of the concrete foundation slab 22 with the end of the manifold or trunk line that is provided with the connector fitting 140 being located on the outside of the foundation wall 28 for ease of access. As shown in FIG. 8, the manifold or trunk line 132 is provided with conventional connectors 142 over which the ends of the branch delivery lines 134 are placed to connect the branch delivery lines to the manifold or trunk line 132. Preferably, the branch delivery lines are flexible smaller diameter hoses or tubes, e.g. one quarter inch nominal inside diameter polymeric hoses or tubes. The branch delivery lines 134 connect the termiticide emitter tubes 136 to the manifold or trunk line 132 at selected locations along the length of the manifold or trunk line 132 to deliver termiticide to the termiticide emitter tubes 136 along the expansion joints or controlled cracks 26 of the slab 22 when the system is in use. The termiticide emitter tube sections 136 are connected to the ends of the branch delivery lines 134 by conventional "T" fittings or other conventional fittings.

As shown in FIG. 1, the manifold or trunk line 232 extends substantially to the farthest grouping of utilities 24 passing through the concrete foundation slab 22 with the end of the manifold or trunk line that is provided with the connector fitting 240 being located on the outside of the foundation wall 28 for ease of access. As shown in FIG. 8, the manifold or trunk line 232 is provided with conventional connectors 242 over which the ends of the branch delivery lines 234 are placed to connect the branch delivery lines to the manifold or trunk line 232. Preferably, the branch delivery lines are flexible smaller diameter hoses or tubes, e.g. one quarter inch nominal inside diameter polymeric hoses or tubes. The branch delivery lines 234 connect the termiticide emitter nozzle assemblies 236 to the manifold or trunk line 232 at selected locations along the length of the manifold or trunk line 232 to deliver termiticide to the termiticide emitter nozzle assemblies 238 at the locations where the utilities 24 pass through the slab 22 when the system is in use. The termiticide emitter nozzle assemblies 238 are connected to the branch delivery lines 234 by conventional "T" fittings, elbow fittings or other conventional fittings.

While, as shown in FIG. 1, there is only one set of manifold or trunk lines 32, 132 and 232, for larger buildings there may be two or more sets of manifold or trunk lines for delivering the termiticide solution to several separate termiticide emitter or delivery systems 20 in different treatment areas of the building.

As shown in FIGS. 2, 3 and 4, the termiticide emitter tube 36 includes a flexible tube 50 and shield 52. The termiticide emitter tube 136 is identical to the termiticide emitter tube 36. Accordingly, the description of termiticide emitter tube 36 also applies to termiticide emitter tube 136. The flexible shield 52 of the termiticide emitter tubes 36 and 136 prevents the dispensing orifices in the tube 50 from being clogged by wet concrete when the concrete foundation slab 22 is poured and forms a flexible, physical termite barrier at the peripheral edges and along the expansion joints or controlled cracks of the concrete foundation slab 22.

Preferably, the flexible tube 50 and shield 52 are integral; made of a flexible polymeric or other suitable material; and the tube, typically, has a one quarter inch nominal inside diameter. The tube 50 is centered relative to the flexible shield 52 which, for a one quarter inch inside diameter tube 50, typically, has a width of about two and one half to about three inches. The flexible shield 52 includes a pair of flanges 54 and 56 extending outwardly from both sides of an upper portion of the tube. Preferably, the shield 52 has a concave lower surface and a convex upper surface and, preferably, the shield 52 is provided with anchors 58 and 60 extending along or adjacent each lateral edge of the shield which extend for the length of the termiticide emitter tube 36. Preferably, the anchors 58 and 60 are inwardly and upwardly opening channels, as shown in FIGS. 2–5, for anchoring the termiticide emitter tube into the underside of the concrete foundation slab 22. However, it is contemplated that the anchors 58 and 60 could also include flanges, extending upwardly from the flanges 54 and 56, which are plane, have longitudinal grooves therein, ribs thereon, flanges extending outwardly therefrom rather than inwardly like the channels shown in the FIGS. 2–5, or similar means for retaining the termiticide emitter tube 36 or 136 anchored to the slab. While not preferred, it is also contemplated that the anchors 58 and 60 may be located other than along or adjacent the lateral edges of the shield 52, e.g. more centrally located on the shield. The flexibility of the shield 52 along with its curved transverse cross section and anchors permits the shield to accommodate expansion and contraction of the slab while remaining secured to the slab 22 to provide a physical termite barrier.

As shown in FIG. 2, preferably, the underside of the tube 50 is located in a horizontally extending plane 62 that is in, substantially in, or slightly above a horizontally extending plane 64 passing through the undersides of the lateral peripheral edges of the shield 52. The location of the underside of the tube 50 in this plane 62, beneath the concave lower surface of the shield 52 further helps to assure that wet concrete will not reach the tube orifices when the concrete foundation slab is poured.

The tube 50 has a plurality of downwardly directed dispensing orifices 66 spaced along the length of the tube for emitting termiticide solution from the tube 50 in a generally downward direction below the horizontal. Preferably, the dispensing orifices are laser drilled, equally spaced along the length of the tube 50, e.g. every nine inches; have uniform or equal diameters; and are sized at a diameter between 0.008 and 0.010 inches. This structure (uniform spacing and hole size) permits the termiticide emitter tubes 36 and 136 to be calibrated for treatments or in other words, the amount of termiticide solution dispensed per linear foot of tube can be determined to assure that the required amount of termiticide is delivered to the fill dirt beneath the concrete foundation slab per linear foot of the termiticide emitter tube. Preferably, the dispensing orifices 66 are located in the bottom of the tube 50, passing vertically or substantially vertically down through the tube, and have a configuration that causes the termiticide solution to be dispensed with a fan type spray pattern. However, in addition to passing vertically downward through the tube, the dispensing orifices can also pass through the lower portions of the tube sidewall, below a horizontal plane passing through the center of the tube, in generally downward directions on either or both sides of the tube to direct the termiticide solution spray to particular locations relative to the termiticide emitter tube 36.

In the event of a subterranean termite infestation, rate instructions on pesticide labels and in state and local codes require four (4) gallons of termiticide solution to be dispensed per each ten (10) linear feet to critical areas such as adjacent the edges of the concrete foundation slab 22, the utility openings 24, the expansion joints or controlled cracks 26, etc. Since in the preferred termiticide emitter tube 36 and 136, a known length of the termiticide emitter tube has a known number of equally spaced apart dispensing orifices of the same diameter, by passing a constant pressure supply of termiticide solution through a volumetric measuring flow meter, the amount of termiticide solution dispensed per linear foot of the termiticide emitter tube can be determined and controlled when performing soil treatments with the termiticide emitter system 20 of the present invention. To deliver four gallons of termiticide solution to each ten foot length of termiticide emitter tube 36 or 136 in a zone, the total length of termiticide emitter tube in a zone supplied by a particular manifold or trunk line 32 or 132 is multiplied by 0.40 to arrive at the amount of termiticide solution to deliver through the system to the zone. For example, to calculate the amount of termiticide solution to be delivered to a zone of a system 20, having 225 feet of termiticide emitter tube 36 or 136 in the zone, in order to deliver four gallons of termiticide solution per ten linear feet to the termiticide emitter tube, multiply 225 by 0.40 (225×0.40=90 gallons of termiticide solution to be delivered through the system to the zone).

FIG. 4. shows the termiticide emitter tube 36 or 136 anchored to the underside of a concrete foundation slab 22 beneath an expansion joint or controlled crack 26 with the dispensing orifices facing downward. Thus, in addition to providing a shield to prevent the dispensing orifices of the tube 50 from becoming clogged by wet concrete when the concrete foundation slab is poured, the shield, with its anchors, creates a physical barrier to help prevent termites from ascending through openings in or adjacent the concrete foundation slab, such as the expansion joints or controlled cracks 26 or along the peripheral edges of the slab, where the termiticide emitter tube is installed. Frequently, the fill dirt beneath a concrete foundation slab settles over time, at least in certain locations beneath the slab. The anchoring to the termiticide emitter tube 36 into the underside of the concrete foundation slab 22 assures that the termiticide emitter tube will not become separated from the slab should the fill dirt settle and keeps the termiticide emitter tube 36 in place beneath openings such as the expansion joints or controlled cracks in the slab to provide a physical termite barrier. In addition and as mentioned above, the flexibility of the shield 52 along with its curved transverse cross section and anchors permits the shield to accommodate expansion and contraction of the slab while remaining secured to the slab 22 to provide a physical termite barrier.

Figure 5:
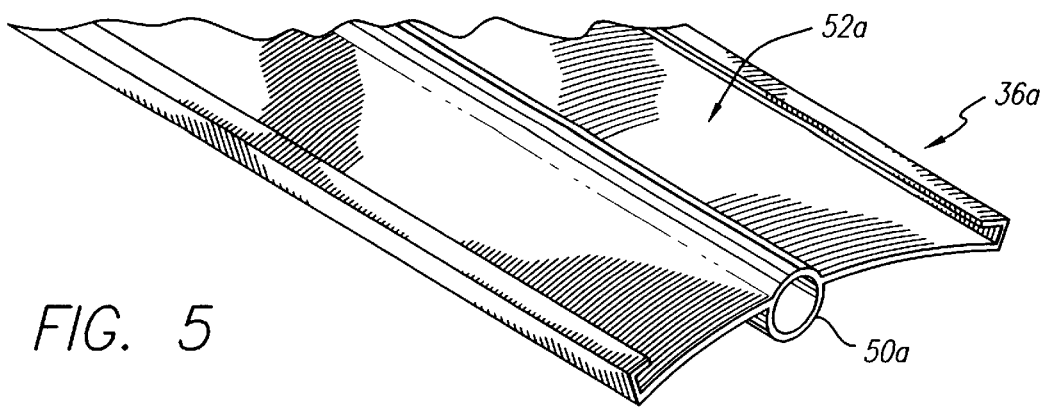
FIG. 5 is a perspective view of another termiticide emitter tube of the present invention.

FIG. 5 shows another termiticide emitter tube 36a of the present invention. The termiticide emitter tube 36a is identical to the termiticide emitter tube 36 of FIGS. 2–4, with one exception, the flanges of the flexible shield 52a extend outward from both sides of the tube 50a intermediate a horizontal plane passing through the center of the tube and the top of the tube 50a rather than from the top of tube as in the termiticide emitter tube 36. The termiticide emitter tube 36a can also be used as termiticide emitter tube 136.

FIGS. 6 and 7 show the preferred termiticide emitter nozzle assembly 238 used in the termiticide emitter system 20 of the present invention. As shown in FIG. 1, the termiticide emitter nozzle assembly 238 is used adjacent the utilities 24 passing up through the concrete foundation slab 22 with one or more termiticide emitter nozzle assemblies 238 being used at each location. FIG. 6 shows the termiticide emitter nozzle assembly 238 connected to a mid-portion of a branch feed line 234 by the conventional "T" connector fitting while FIG. 7 shows the termiticide emitter nozzle assembly 238 connected to the end of a branch feed line 234 by a conventional elbow fitting. The termiticide emitter nozzle assemblies 238 are inserted into the ground, with the nozzle at the lower end of the assembly, adjacent the utilities 24 and dispense termiticide solution into the fill dirt about the utilities. As shown, the termiticide emitter nozzle assemblies 238 are provided with flexible shields 252 with anchors for securing the nozzle assemblies to the underside of the concrete foundation slab 22. The lengths and widths of the shields are selected to prevent concrete from clogging the orifices of the nozzle assemblies 238 when the slab 22 is poured. Preferably, the size of the orifices in the termiticide emitter nozzle assemblies 238 are the same as the orifice size used in the termiticide emitter tubes 36 and 136 so that the correct amount of termiticide to be delivered to the areas adjacent the utilities 24 can be determined.

When it becomes advisable to retreat the fill dirt beneath a building using the termiticide emitter system 20, a licensed pest control service person successively connects a delivery tube from a pressurized source of termiticide solution (preferably with a flow meter) to the manifold or trunk line connector 40, 140 and 240 of each of the zones and injects the calculated amount of termiticide solution into the system 20 to dispense the required amount of termiticide solution per linear foot of termiticide emitter tube 36 and 136, e.g. four gallons per linear foot, and the required amount of termiticide solution through the termiticide emitter nozzle assemblies adjacent the utilities.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A termiticide emitter tube for use in termiticide delivery systems for forming a physical termite barrier and delivering termiticide to potential termite entry areas of the fill dirt underneath the concrete foundation slab of a building, including the edges of the concrete foundation slab adjacent foundation walls of the building and along expansion joints and controlled cracks of the concrete foundation slab, comprising:

a flexible, polymeric tube which includes a plurality of downwardly directed dispensing orifices spaced along the length of the tube for emitting termiticide in a generally downward direction below a longitudinal axis of the tube; and a flexible, polymeric upper shield means integral with the tube and extending along an upper portion of the tube for the length of the tube for preventing the dispensing orifices of the tube from being clogged by wet concrete when the foundation slab is poured and for forming a physical termite barrier; the upper shield means has a curved transverse cross section with a concave lower surface; the upper shield means having a pair of lateral edges spaced outwardly from each side of the tube and extending for the length of the tube; and undersides of the lateral edges of the upper shield means and the tube lie in generally the same horizontal plane.

2. The termiticide emitter tube according to claim 1, wherein: the dispensing orifices have a uniform diameter and are uniformly spaced along the tube to enable a calibration of the termiticide emitter tube for termiticide solution emission per linear foot of the termiticide emitter tube.

3. The termiticide emitter tube according to claim 1, wherein: the dispensing orifices are directed substantially vertically downward.

4. The termiticide emitter tube according to claim 1, wherein: each of the lateral edges of the upper shield means has anchor means for anchoring the termiticide emitter tube into the underside of the concrete foundation slab and creating a physical barrier to prevent termites from ascending through portions of the concrete foundation slab where the termiticide emitter tube is installed.

5. The termiticide emitter tube according to claim 4, wherein: the anchor means are upwardly and inwardly opening channels extending along each of the lateral edges of the upper shield means.

6. A termiticide emitter tube for use in termiticide delivery systems for forming a physical termite barrier and delivering termiticide to potential termite entry areas of the fill dirt underneath the concrete foundation slab of a building, including the edges of the concrete foundation slab adjacent foundation walls of the building and along expansion joints and controlled cracks of the concrete foundation slab, comprising:

a flexible, polymeric tube which includes a plurality of downwardly directed dispensing orifices spaced along the length of the tube for emitting termiticide in a generally downward direction below a longitudinal axis of the tube; the dispensing orifices having a uniform diameter and being uniformly spaced along the tube to enable a calibration of the termiticide emitter tube for termiticide solution emission per linear foot of the termiticide emitter tube; and a flexible, polymeric upper shield means integral with the tube and extending along an upper portion of the tube for the length of the tube for preventing the dispensing orifices of the tube from being clogged by wet concrete when the foundation slab is poured and for forming a physical termite barrier; the upper shield means having a pair of lateral edges spaced outwardly from each side of the tube and extending for the length of the tube; the upper shield means having a curved transverse cross section with a concave lower surface; each of the lateral edges of the upper shield means having anchor means comprising upwardly and inwardly opening channels extending along each of the lateral edges of the upper shield means for anchoring the termiticide emitter tube into the underside of the concrete foundation slab and creating a physical termite barrier that can accommodate expansion and contraction of a concrete foundation slab to prevent termites from ascending through portions of the concrete foundation slab where the termiticide emitter tube is installed; and undersides of the lateral edges of the upper shield means and the tube lying in generally the same horizontal plane.

7. A termiticide delivery system for forming a physical termite barrier and delivering termiticide to potential termite entry areas of the fill dirt underneath the concrete foundation slab of a building, including the edges of the concrete foundation slab adjacent foundation walls of the building and along expansion joints and controlled cracks of the concrete foundation slab, comprising:

a flexible, polymeric termiticide emitter tube disposed intermediate an upper surface of the fill dirt and the underside of the concrete foundation slab at the peripheral edges of and along any expansion joints and controlled cracks in the concrete foundation slab; the emitter tube including a tube having a plurality of downwardly directed dispensing orifices spaced along the length of the tube for emitting termiticide in a generally downward direction below a longitudinal axis of the tube; and a flexible, polymeric upper shield means integral with the tube and extending along an upper portion of the tube for the length of the tube for preventing the dispensing orifices of the tube from being clogged by wet concrete when the foundation slab is poured and for forming a physical termite barrier; the upper shield means having a curved transverse cross section with a concave lower surface; the upper shield means having a pair of lateral edges spaced outwardly from each side of the tube and extending for the length of the tube; each of the lateral edges of the upper shield means having anchor means anchoring the termiticide emitter tube into the underside of the concrete foundation slab and creating a physical barrier to prevent termites from ascending through portions of the concrete foundation slab where the termiticide emitter tube is installed; the anchor means of the lateral edges of the upper shield means being upwardly and inwardly opening channels extending along each of the lateral edges of the upper shield means; and means for delivering a pressurized source of termiticide solution to the termiticide emitter tube.

8. The termiticide delivery system according to claim 7, wherein: the dispensing orifices of the tube have a uniform diameter and are uniformly spaced along the tube to enable a calibration of the termiticide emitter tube for termiticide solution emission per linear foot of the termiticide emitter tube.

9. The termiticide delivery system according to claim 7, wherein: the dispensing orifices of the tube are directed substantially vertically downward.

10. The termiticide delivery system according to claim 7, wherein: undersides of the lateral edges of the upper shield means and the tube lie in generally the same horizontal plane.

11. A termiticide delivery system for forming a physical termite barrier and delivering termiticide to potential termite entry areas of the fill dirt underneath the concrete foundation slab of a building, including the edges of the concrete foundation slab adjacent foundation walls of the building and along expansion joints and controlled cracks of the concrete foundation slab, comprising:

a flexible, polymeric termiticide emitter tube disposed intermediate an upper surface of the fill dirt and the underside of the concrete foundation slab at the peripheral edges of and along any expansion joints and controlled cracks in the concrete foundation slab; the emitter tube including a tube having a plurality of downwardly directed dispensing orifices spaced along the length of the tube for emitting termiticide in a generally downward direction below a longitudinal axis of the tube; the dispensing orifices in the tube having a uniform diameter and being uniformly spaced along the tube to enable a calibration of the termiticide emitter tube for termiticide solution emission per linear foot of the termiticide emitter tube; and a flexible, polymeric upper shield means integral with the tube and extending along an upper portion of the tube for the length of the tube for preventing the dispensing orifices of the tube from being clogged by wet concrete when the foundation slab is poured and for forming a physical termite barrier; the upper shield means having a concave lower surface; the upper shield means having a pair of lateral edges spaced outwardly from each side of the tube and extending for the length of the tube with undersides of the lateral edges of the upper shield means and the tube lying in generally the same horizontal plane; each of the lateral edges of the upper shield means having anchor means anchoring the termiticide emitter tube into the underside of the concrete foundation slab and creating a physical barrier to prevent termites from ascending through portions of the concrete foundation slab where the termiticide emitter tube is installed; and the anchor means of the lateral edges of the upper shield means being upwardly and inwardly opening channels extending along each of the lateral edges of the upper shield means; and means for delivering a pressurized source of termiticide solution to the termiticide emitter tube.

12. The termiticide delivery system according to claim 11, including:

a termiticide emitter nozzle assembly inserted into the fill dirt adjacent utilities passing up through openings in the concrete foundation slab; the termiticide emitter nozzle assembly having a generally downwardly directed dispensing orifice; and means for delivering pressurized termiticide solution to the termiticide emitter nozzle assembly.

* * * * *